US012623325B2

(12) United States Patent
Yoshikane et al.

(10) Patent No.: US 12,623,325 B2
(45) Date of Patent: May 12, 2026

(54) DRIVING TOOL

(71) Applicant: MAKITA CORPORATION, Anjo (JP)

(72) Inventors: Kiyonobu Yoshikane, Anjo (JP); Junpei Kamimoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 37 days.

(21) Appl. No.: 18/512,638

(22) Filed: Nov. 17, 2023

(65) Prior Publication Data

US 2024/0181616 A1 Jun. 6, 2024

(30) Foreign Application Priority Data

Dec. 2, 2022 (JP) ................................ 2022-193308
Jan. 13, 2023 (JP) ................................ 2023-003731

(51) Int. Cl.
*B25C 1/04* (2006.01)

(52) U.S. Cl.
CPC .................................... *B25C 1/047* (2013.01)

(58) Field of Classification Search
CPC .. B25C 1/047; B25C 1/06; B25C 1/04; B25C 1/041; B25C 1/008
See application file for complete search history.

(56) References Cited

U.S. PATENT DOCUMENTS

| | | | | |
|---|---|---|---|---|
| 8,286,722 | B2 | 10/2012 | Leimbach et al. | |
| 2018/0154505 | A1* | 6/2018 | Sato .......................... | B25C 1/06 |
| 2021/0031347 | A1 | 2/2021 | Sato et al. | |
| 2023/0211483 | A1 | 7/2023 | Sato et al. | |

FOREIGN PATENT DOCUMENTS

| | | |
|---|---|---|
| JP | 6485544 B2 | 3/2019 |

* cited by examiner

*Primary Examiner* — Veronica Martin
(74) *Attorney, Agent, or Firm* — Oliff PLC

(57) ABSTRACT

A two-member joint structure driver of a driving tool includes a striker and an engagement member. A channel to guide the striker and a release channel for the engaging section of the engagement member to pass through are shifted in a thickness direction of the driver. The width of the guide channel is expanded, and wider striker can be used without expanding the release channel. The cost of the driver can be reduced by having the two-member joint structure.

18 Claims, 14 Drawing Sheets

DRIVING TOOL

TECHNICAL FIELD

The present invention relates to a driving tool for driving a driven member into a workpiece.

BACKGROUND

Japanese Patent No. 6485544 discloses a gas-spring type driving tool that utilizes compressed gas to strike a driven member. The gas-spring type driving tool has a piston configured to move up and down in a cylinder and a driver that is coupled to the piston and moves a striking channel to strike the driven member. The piston and driver move downward in the driving direction due to gas pressure in a storage chamber in the cylinder. The piston and the driver are returned in an anti-driving direction by a lift mechanism.

The lift mechanism has a wheel that is sequentially engaged with a plurality of engagement portions provided on the driver. The wheel is rotated by an electric motor. After the driving operation, the wheel rotates and engages the engagement portions of the driver one after another, causing the driver to return to the anti-driving direction. As the piston is returned to the anti-driving direction, gas pressure within the storage chamber is increased. As the driver returns, a driven member is fed to the driving channel. The engagement of the lift mechanism to the driver is released near the moving end in the anti-driving direction. As a result, the driver is moved due to the gas pressure to perform the driving action on the driven member.

According to the driving tool, a release channel for a plurality of engagement portions provided on the driver to pass through is formed in parallel with the driving channel for the driver to move. This may cause a problem where a driving nose increases in size when the release channel is formed in parallel with the wide driving channel that guides a wide driven member, such as a staple, for example. There has been a need for a driving tool that enables a wide driven member to be used without increasing the size of the driving nose.

Solution to Problem

According to one aspect of the present disclosure, a driving tool may include, for example, a piston that moves due to gas pressure and a driver provided with the piston that moves together with the piston to strike a driven member. The driving tool may include, for example, a plurality of engaging sections formed on the driver along a moving direction of the driver, and a lifter that successively engages with the plurality of engaging sections to return the driver to its initial position. The driver has a striker that strikes the driven member and an engagement member that includes the plurality of engaging sections and is joined to the striker in a direction orthogonal to the longitudinal direction of the driver.

Therefore, the engagement member is joined to the striker and displaced in a direction orthogonal to the longitudinal direction of the driver. Therefore, a release channel for the plurality of engaging sections to pass through is displaced in the direction orthogonal to the longitudinal direction of the driver with respect to a driving channel of the driven member. This allows the driving channel to increase in width that enables a wide driven member, such as a staple, to be used without increasing the size of a driving nose.

DESCRIPTION OF EMBODIMENTS

Figure 1:
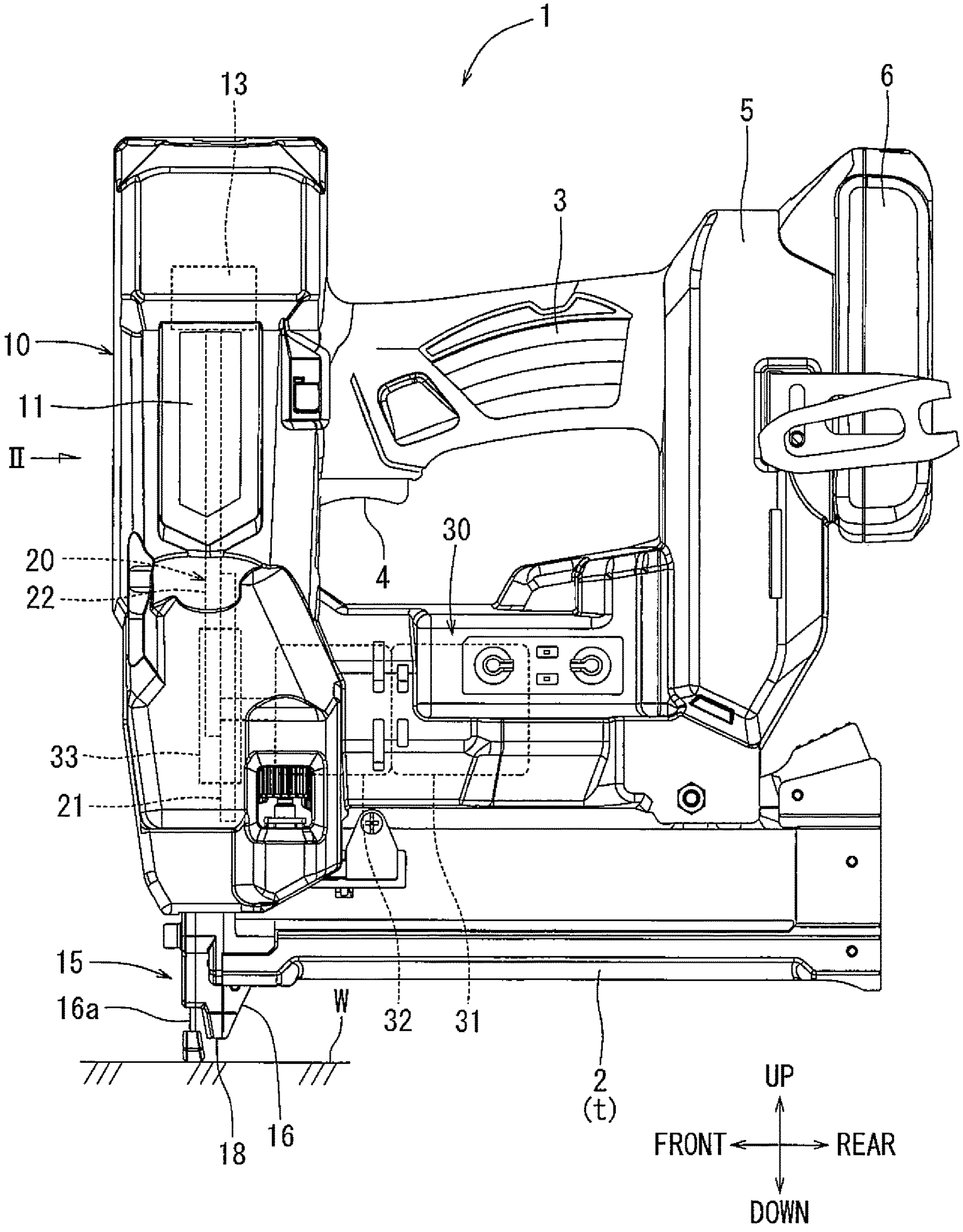
FIG. 1 is an entire side view of a driving tool.

In another aspect of the present disclosure, the driving tool may have a protrusion formed on one of two members such as, for example, a striker and an engagement member, and a recess formed on the other one of the two members, into which the protrusion is fitted. Therefore, the striker and the engagement member are firmly joined by the concave-convex fitting of the protrusion and the recess to enhance durability against impact during driving.

According to another aspect of the present disclosure, a plurality of recess-protrusion fitting portions formed by the protrusion and recess is provided in the longitudinal direction of the driver. Accordingly, the striker and the engagement member are more firmly joined along the longitudinal direction of the driver to enhance the impact resistance of the driver.

In another aspect of the present disclosure, for example, the engagement member has a coupling portion that is coupled to the piston. Therefore, the cost of the driver can be reduced by minimizing a proportion of the striker with a complex shape.

In another aspect of the present disclosure, for example, the striker has a contact portion that extends toward the engagement member to come in contact with an end of the engagement member in the driving direction. Therefore, the impact resistance of the driver at the time of striking the driven member may be enhanced.

In another aspect of the present disclosure, the striker, for example, may have a hook portion that projects to an opposite joining side of the engagement member and prevents the engagement member from being separated. Accordingly, the hook portion receives the force in the joint separating direction (removing direction) of the engagement member, thereby enhancing the strength of the joint between the striker and the engagement member.

In another aspect of the present disclosure, for example, the striker may have a plurality of hook portions each being arranged in the longitudinal direction of the driver. Thus, the strength of joint between the striker and the engagement member may be enhanced.

In another aspect of the present disclosure, for example, the contacting portion may be provided with a hook portion that extends to the opposite joining side of the engagement member to restrict the engagement member from separating. Accordingly, when the end of the engagement member in the driving direction is brought into contact with the contacting portion, displacement of the engagement member in the joint separating direction is restricted by the hook portion. As a result, the impact resistance of the driver is enhanced, and the joint strength of the striker and the engagement member is increased by the hook portion.

In another aspect of the present disclosure, for example, the striker may have a coupling portion to be coupled to the piston. Thus, the striker is directly coupled to the piston to efficiently exert the striking force of the driver. The joint structure is simplified because the force in the removing direction is not applied to the engagement member when the driven member is driven.

In another aspect of the present disclosure, for example, the plurality of engaging sections may include a first engaging section at the leading end in the moving direction of the driver and a final engaging section at the final end. The engagement member has a first fitting portion for the striker to engage at a position corresponding to at least a part of the leading engaging section and a second fitting portion for the striker to engage at a position corresponding to at least a part of the final engaging section. Thus, the joint strength of the engagement member to the striker is enhanced over the entire area of the plurality of engaging sections in the moving direction of the driver.

In driving tools, a wider driver may be applied to strike a wider driven member, such as a staple, for example. The problem is that the wider the driver, the larger a driving nose becomes. Particularly, in a configuration where a wheel's (engaged portion) engagement pin is supported at both ends, the driving nose tends to become larger to avoid interference of the driver with the wheel. There is therefore a need for the wider driving tools without increasing the size of the driving nose.

According to one aspect of the present disclosure, the driving tool includes, for example, a piston that moves by gas pressure and a striker that is provided with and connected to the piston and moves together with the piston to strike a driven member. The driving tool has an engagement member that overlaps the striker in a direction orthogonal to the moving driving direction of the driver and has a plurality of engaging sections along the driving direction. The driving tool has a lifter provided with a plurality of engaged portions that are rotated by, for example, an electric motor to engage the plurality of engaging sections sequentially and return the driver to the initial position. For example, each of the plurality of engaged portions has a first end connected to a first flange of the lifter and a second end connected to a second flange of the lifter. For example, when viewed from a direction orthogonal to the axial direction of the plurality of engaged portions, the plurality of engaging sections and a corresponding area of the striker corresponding to the plurality of engaging sections fit in an axial area corresponding to an interval between the first and second flanges.

Thus, the striker and the engagement member are compactly arranged within the axial area of the engaged portion. This facilitates the widening of the striker. By adopting a wider striker while avoiding the size of the driving nose from increasing, a wider staple may be stably driven.

In another aspect of the present disclosure, the driving tool may include, for example, a connecting portion for connecting the striker and the engagement member. Thus, the impact resistance of the striker and the engagement member is enhanced.

In another aspect of the present disclosure, the driving tool includes, for example, a guide portion configured to guide the connecting portion along the driving direction. Thus, the movement of the striker in the driving direction is stabilized.

In another aspect of the present disclosure, for example, the striker has a flat plate shape. Thus, the compactly arranged striker stabilizes the driving action of, for example, a wide staple.

In another aspect of the present disclosure, for example, the striker may be located within the width of the engagement member. This keeps the striker being compactly arranged and an increase in the size of the driving nose may be avoided.

In another aspect of the present disclosure, for example, the minimum distance between the striker and the engaged portion is less than the width of the striker. Thus, the striker is positioned closer to the engaged portion to avoid an increase in the size of the driving nose.

In another aspect of the present disclosure, for example, the thickness of the engagement member is greater than the thickness of the striker. Accordingly, the engagement portion is securely engaged with the engaged portion, thereby ensuring a smooth return motion of the striker.

In another aspect of the present disclosure, for example, the center of thickness of the engagement member coincides with the center of the piston, thereby ensuring a smooth return motion of the piston.

In another aspect of the present disclosure, for example, the first and second flanges of the lifter are formed of one member. Thus, the lifter is ensured to have high rigidity.

In another aspect of the present disclosure, for example, a striker and an engagement member, which are mutually separate members, are joined to each other. Thus, it is easier to ensure the lightweight and durability of the striker and the engagement member. The manufacturing cost may be reduced as the striker and the engagement member are made as separate components.

EMBODIMENTS

A first embodiment of the present disclosure will be described with reference to the drawings FIGS. 1-11. As one example of a driving tool 1, the depicted gas-spring type driving tool uses gas pressure in a storage chamber above a cylinder as a thrust force to drive a driven member t. For example, a U-shaped staple may be used as the driven member t. In the following description, the driving direction of the driven member t is a downward direction and the counter-driving direction is an upward direction. In FIG. 1, the user of the driving tool 1 is positioned on the right side (grip 3 side) of the driving tool 1. The side in front of the user is a rearward direction (user side), and the side opposite the front side is a frontward direction. The left and right directions are relative to the user's grip 3.

Figure 2:
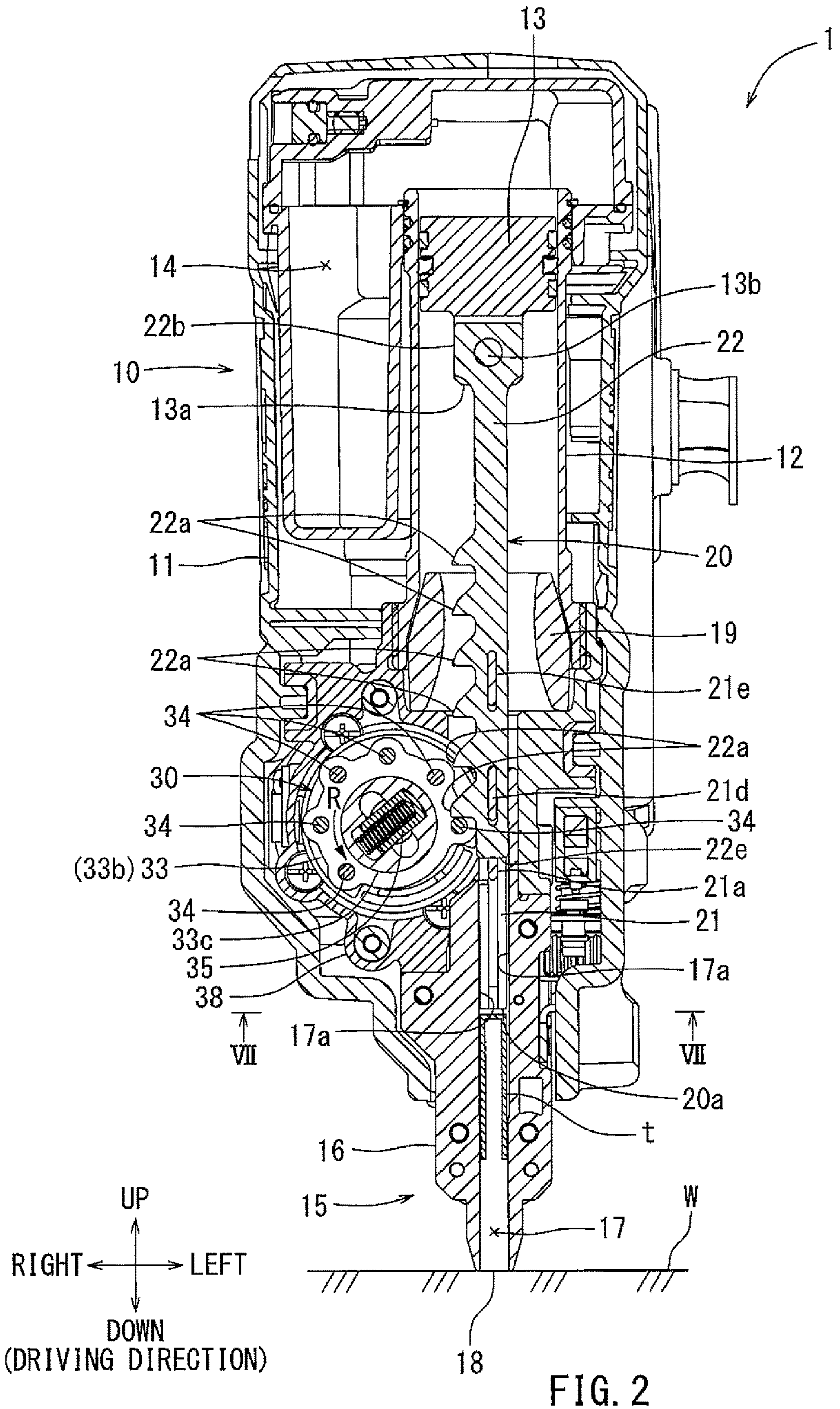
FIG. 2 is a front view of a driving nose as viewed from the direction of an arrow II in FIG. 1. This view illustrates a driver in an upper standby position.
Figure 3:
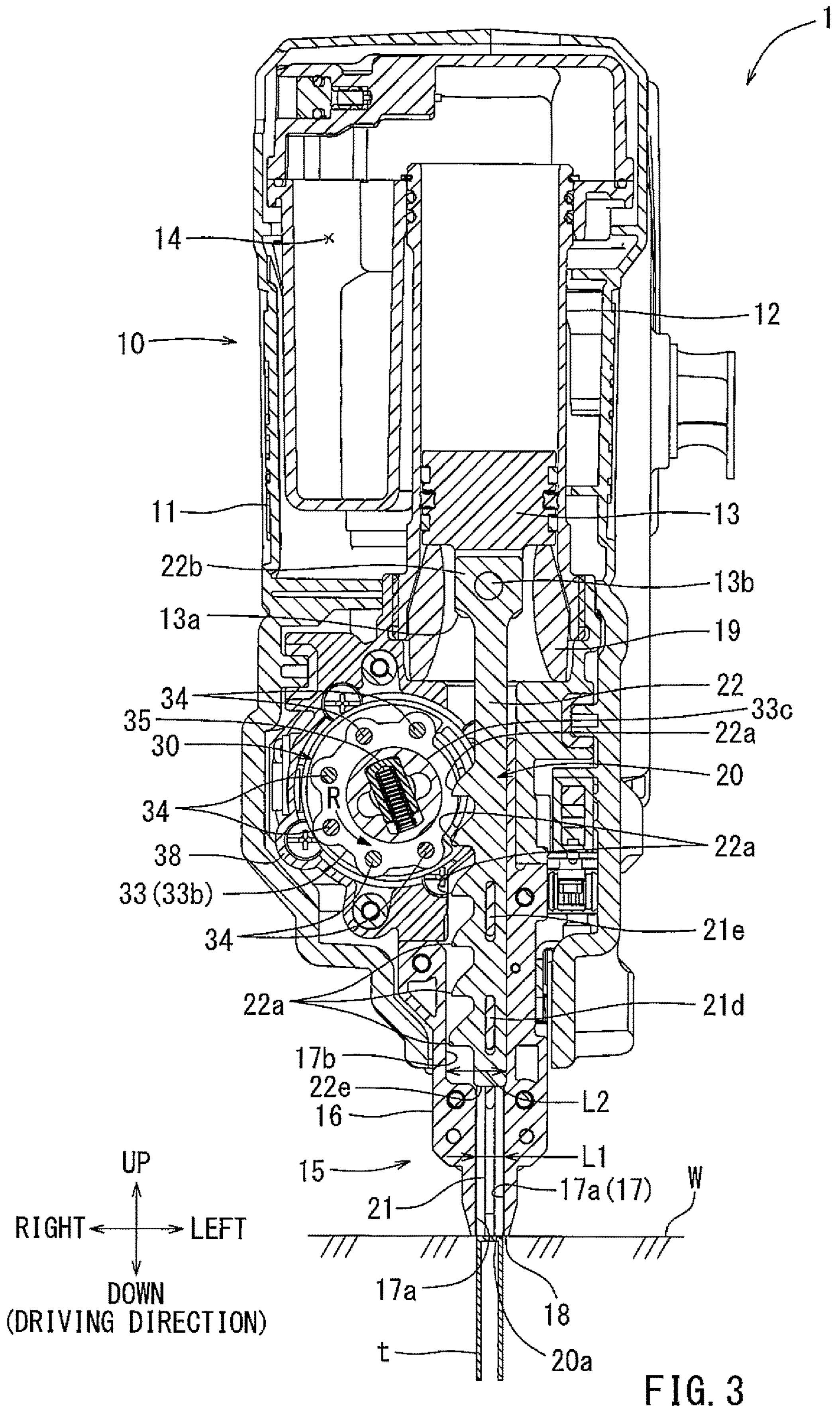
FIG. 3 is a front view of the driving nose as viewed from the direction of the arrow II in FIG. 1. This view illustrates the driver in a downward motion end.

As shown in FIGS. 1 to 3, the driving tool 1 has a tool body 10. The tool body 10 is configured to have a cylinder 12 housed in a substantially cylindrical body housing 11. A piston 13 is housed in the cylinder 12, which reciprocally moves up and down. An upper portion of the cylinder 12 above the piston 13 communicates with a pressure storage chamber 14. The pressure storage chamber 14 may be filled with compressed gas, such as air, for example. The gas pressure in the pressure storage chamber 14 acts as a thrust force on the upper surface of the piston to move downward.

A driving nose 15 is provided at a lower part of the tool body 10. The driving nose 15 has a driver guide 16 and a contact arm 16*a*. The inner circumference of the driver guide 16 defines a driving channel 17. The driving channel 17 communicates with a lower side of the cylinder 12. A long driver 20 enters the driving channel 17 so as to be reciprocally movable up and down. A contact arm 16*a* projects from the end of the driving nose 15. The contact arm 16*a* is movable up and down with respect to the end of the driving nose 15. A pulling operation of the switch lever 4 is enabled as the contact arm 16 is pressed against the workpiece W and is allowed to move upward with respect to the driving nose 15.

Figure 11:
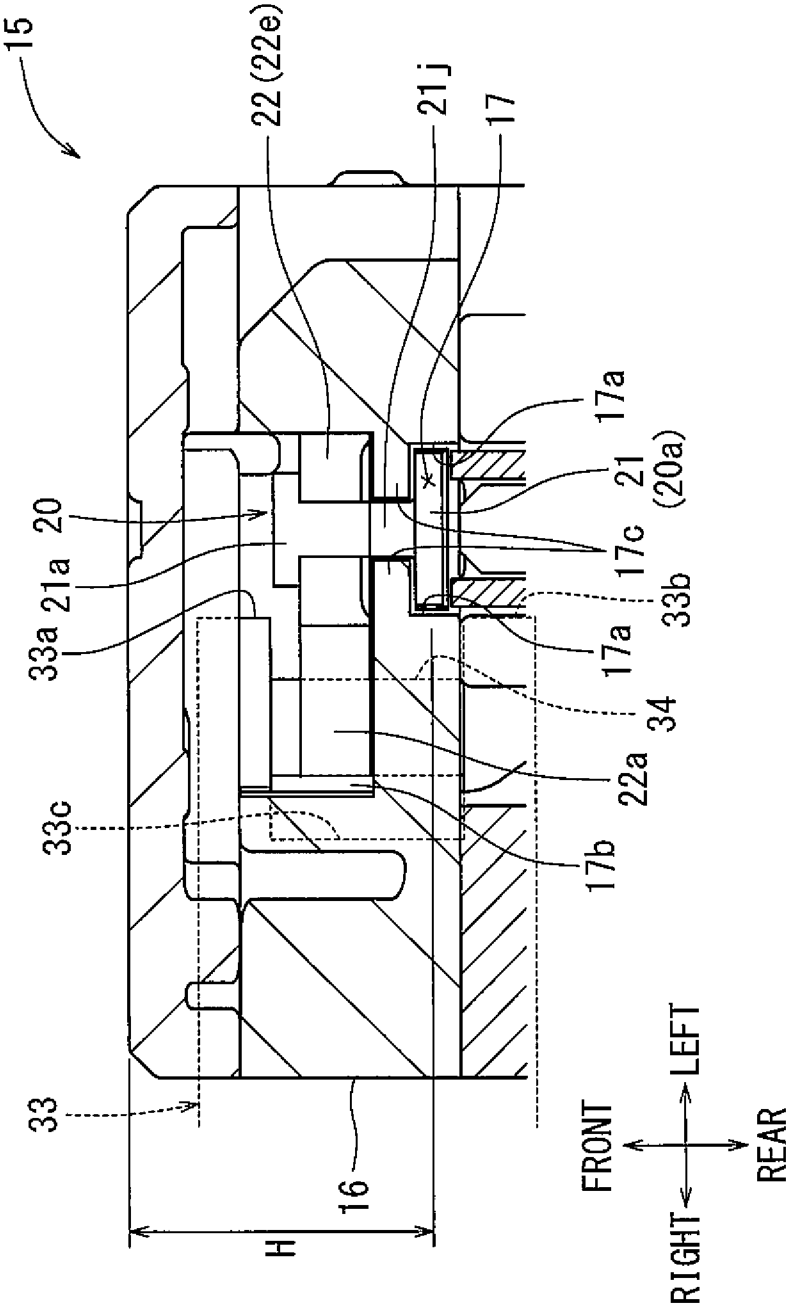
FIG. 11 is a lateral sectional view of the driver and the lift mechanism according to the first example.

As shown in FIGS. 2, 3, and 11, the driving channel 17 has left and right guide walls 17*a* that guide the striker 21 of the driver 20 described below and a release channel 17*b* for passing the engaging section 22*a*. The left and right guide walls 17*a* and the release channel 17*b* are displaced in the front-back direction (in the direction of the thickness of the driver 20). In FIG. 2, the striker 21 of the driver 20 is shown being guided by the left and right guide walls 17*a*. In FIG. 3, the engaging section 22*a* of the driver 20 is shown entering the release channel 17*b*. When the driver 20 moves down during the driving action, the engaging section 22*a* enters the release channel 17*b*.

As shown in FIG. 1, a magazine 2 is coupled to a rear side of the driving nose 15. A number of driving tools t are loaded in the magazine 2. The driving tools t are fed one by one from inside the magazine 2 into the driving channel 17 of the driving nose 15 in conjunction with the driving operation of the tool body 10. One of the driving tools t fed in the driving channel 17 is struck by the driver 20, which moves downwards.

A grip 3 is provided on a rear side of the tool body 10 for the user to grasp. On the front lower side of the grip 3, a switch lever 4 is provided for starting the tool, which is operated by the user pulling it with his/her fingertip. A battery mounting portion 5 is provided at a rear of the grip 3. A battery pack 6 is mounted on the rear side of the battery mounting portion 5. The battery pack 6 can be attached to and removed from the battery mounting portion 5 by sliding it up and down. The battery pack 6 can be recharged by removing it from the battery mounting portion 5 and charging it with a separately prepared charger. The battery pack 6 is versatile enough to be used as a power source for other power tools. An electric motor 31 of the lift mechanism 30 as will be described below, is operated by the electric power of the battery pack 6.

As shown in FIGS. 2 and 3, a downward motion end damper 19 is placed at the bottom of cylinder 12 to absorb the shock at the downward motion end of the piston 13. A driver 20 of the first embodiment is coupled to the center of the lower side of the piston 13. The driver 20 extends long downward from the lower side of the piston 13. The end side (lower side) of the driver 20 in the driving direction passes through the inner circumference of the downward motion end damper 19 and enters the driving channel 17. The driver 20 moves downwards within the driving channel 17 due to the gas pressure of the storage chamber 14 acting on an upper surface of the piston 13. A leading end (lower end) 20*a* of the driver 20, which moves downward within the driving channel 17, strikes one driven member t that is fed in the driving channel 17. The driven member t is ejected from the ejection port 18. The ejected driven member t is driven into the workpiece W.

Figure 8:
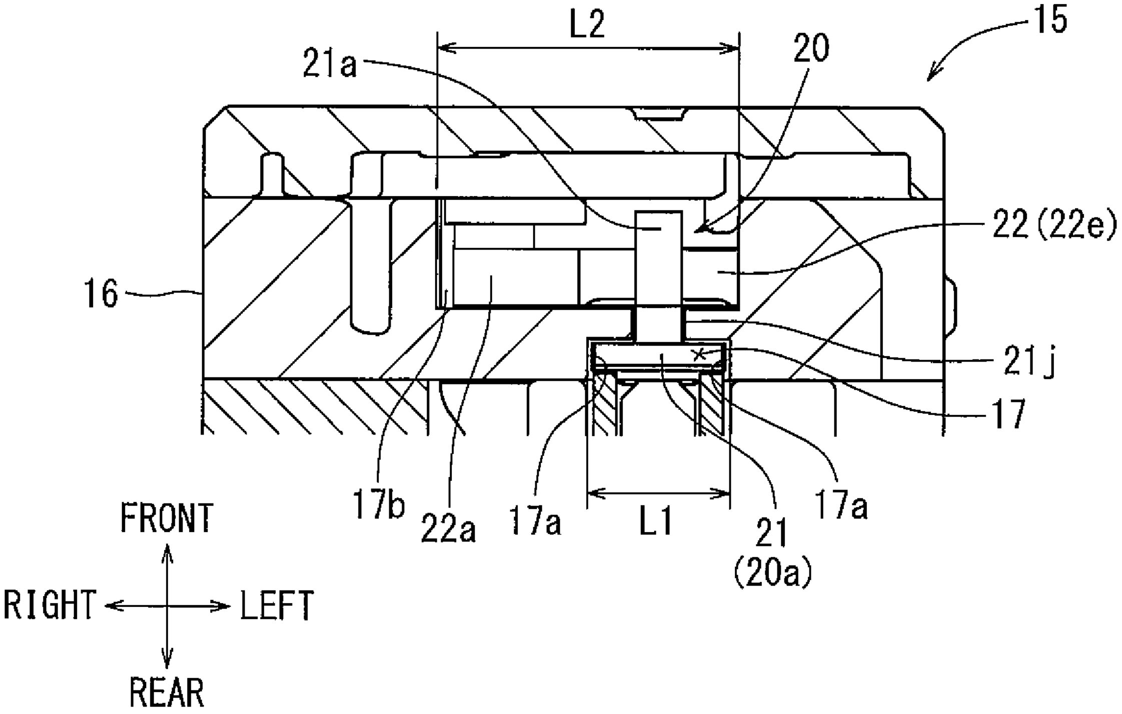
FIG. 8 is a cross-sectional view taken along the line VIII-VIII in FIG. 2, which is a cross-sectional view of a driving channel.
Figure 9:
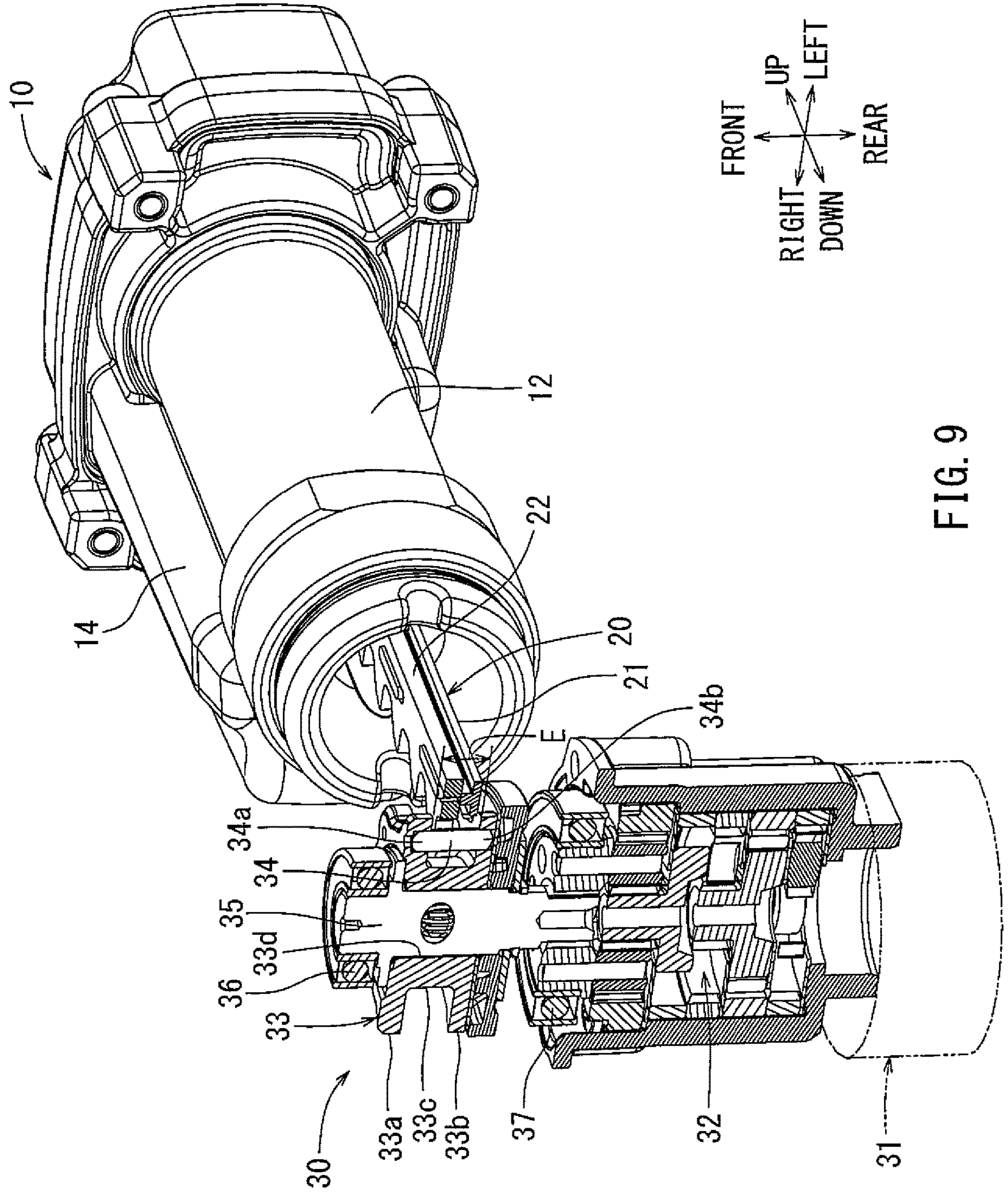
FIG. 9 is a perspective view of the driver according to the first embodiment, showing a vertical sectional view of a lift mechanism.

As shown in FIG. 1, the lift mechanism 30 is provided below the grip 3. The lift mechanism 30 is provided between the lower part of the battery mounting portion 5 and the tool body 10. The lift mechanism 30 is provided across the rear side of the tool body 10 and the lower part of the battery mounting portion 5. The lift mechanism 30 has an electric motor 31 as a drive source. One lift wheel (lifter) 33 is supported in front of the electric motor 31 via a reduction gear train 32. As shown in FIGS. 8 and 9, an output shaft 35 of the reduction gear train 32 is rotatably supported to a lifter housing 38 via bearings 36 and 37. The lift wheel 33 is supported on the output shaft 35.

A plurality (e.g., six in the figure) of engaging sections 22*a* are formed on a right side of the driver 20. Each engaging section 22*a* has a rack tooth shape projecting to the right. The plurality of engaging sections 22*a* are arranged at constant intervals in the longitudinal (vertical) direction of the driver 20. The lift wheel 33 of the lift mechanism 30 is sequentially engaged with the plurality of engaging sections 22*a*.

As shown in FIG. 2, a lift wheel (lifter) 33 is located at the right side of the driver 20. The lift wheel 33 has a plurality (e.g., six) of engaging portions (engaged portion, engagement pins) 34 that are sequentially engaged with the engaging sections 22*a* of the driver 20. A cylindrical shaft member (pin) is used for each engaging portion 34. The plurality of engaging portions 34 are arranged at constant intervals along the outer circumferential edge of the lift wheel 33. A large interval in the rotational direction (an area where no engaging portion 34 is provided) is formed between the first and last engagement portions 34 in the rotational direction. When this interval is directed toward the driver 20, the engaged state of the lift wheel 33 with respect to the engaging section 22*a* of the driver 20 is released. FIG. 2 shows the standby state immediately before the engaged state is released. FIG. 3 shows a driving state in which the engaged state is released. The driver 20 and piston 13, which have reached the downward motion end, return to the upper standby position by the lift mechanism 30.

Starting the electric motor 31 causes the lift wheel 33 to rotate in a direction of arrow R (counterclockwise direction in FIGS. 2 and 3). FIG. 3 shows a state immediately after the driver 20 has reached the downward motion end to drive the driven member t. As shown in FIG. 3, the lift wheel 33 is located on the right side of the driver 20. After the driver 20 has reached the downward motion end, rotation of the lift wheel 33 in the direction of the arrow R causes the driver 20 to return upward as the engaging portion 34 is sequentially engaged with the engaging section 22*a* of the driver 20 from below. As the piston 13 is returned upward by the lift mechanism 30, the gas pressure within the storage chamber 14 is increased. When the driver 20 returns to the initial position shown in FIG. 2, the electric motor 31 stops and the series of driving actions will end.

When the switch lever 4 is pulled again, the lift mechanism 30 is restarted. This causes the lift wheel 33 to rotate in the direction of arrow R, such that the lift wheel 33 is disengaged from the engaging section 22*a* of the driver 20. This causes the driver 20 to move downward due to the gas pressure in the storage chamber 14 acting on the piston 13. As the driver 20 moves downward through the driving channel 17, the driven member t is struck and driven into the workpiece W.

As shown in FIGS. 4 to 7, the driver 20 of the first embodiment has a two-member joint structure in which a striker 21 and an engagement member 22 are joined to form a single unit. The striker 21 and engagement member 22 each have a strip shape. In the first embodiment, the striker 21 and engagement member 22 are made of the same steel material and are subjected to the same heat treatment and surface treatment to ensure a certain level of wear resistance and toughness.

According to the driver 20 of the first embodiment, the front surface of the striker 21 and the rear surface of the engagement member 22 are joined with each other. The area of approximately half of the upper side of the striker 21 and the area of approximately half of the lower side of the engagement member 22 are the joints J. The striker 21 and the engagement member 22 are firmly joined by, for example, copper brazing or welding.

Figure 4:
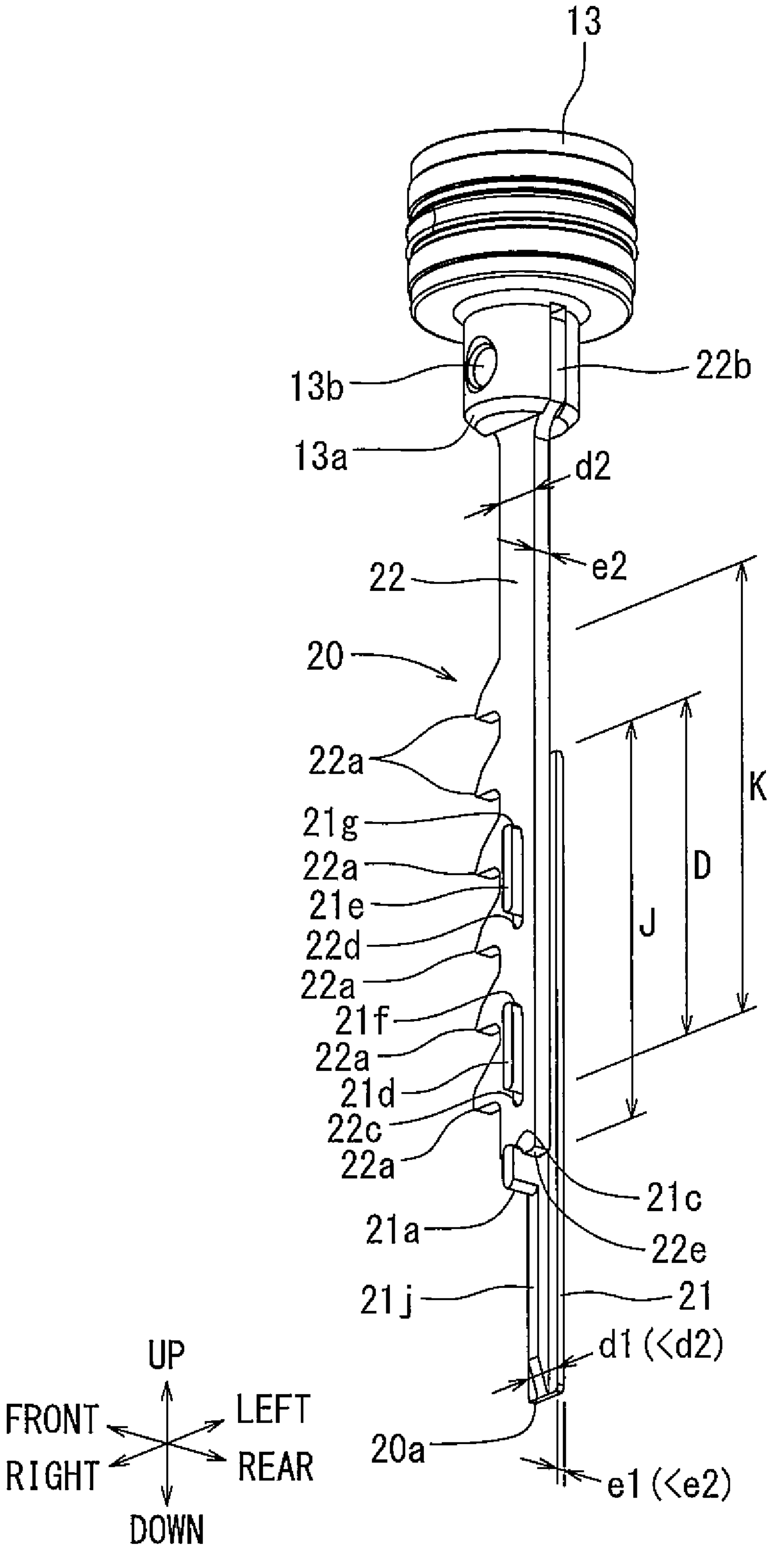
FIG. 4 is a perspective view of the driver according to the first embodiment.

As shown in FIG. 4, in the first example, a coupling portion 22*b* to the piston 13 is provided at the top of the engagement member 22. A bifurcated coupling portion 13*a* is provided in the center of the lower side of the piston 13. The coupling portion 22*b* is inserted into the connecting portion 13*a* to allow the connecting pin 13*b* be inserted, thereby connecting the engagement member 22 to the lower side of the piston 13. As a result, the engagement member 22 is connected to the central axis of the piston 13. The center of the thickness e2 of the engagement member 22 coincides with the center of the piston 13. The thickness e2 of the engagement member 22 is greater than the thickness e1 of the part of the striker 21 excluding the connecting portion 21*j* (e1<e2).

The above-described six engagement portions 22*a* are provided on the right side of the engagement member 22. Two recesses 22*c*, 22*d* are formed in the engagement member 22. The two recesses 22*c*, 22*d* each have an elongated groove hole shape penetrating in the thickness direction. Each of the two recesses 22*c*, 22*d* linearly extends at a certain interval from each other in the longitudinal direction (driving direction) of the driver 20.

A projecting strip (connecting portion) 21*j* is formed on the front side of the striker 21 over its entire length. The projecting strip 21*j* is provided along the center of the striker 21 in the left-right width direction, projecting forward with a constant width. The front side of the projecting strip 21*j* is joined to the rear side of the engagement member 22. The projecting strip-shaped connection 21*j* enhances the impact resistance of the driver 20. The striker 21 has a length that projects from the longitudinal midpoint of the engagement member 22 to the leading end in the driving direction. The striker 21 has a strip shape with a width d1 that is equal to or less than the width d2 excluding the engaging section 22*a* of the engagement member 22 (d1<d2). The leading end 20*a* of the striker 21 strikes the driven member t.

Figure 5:
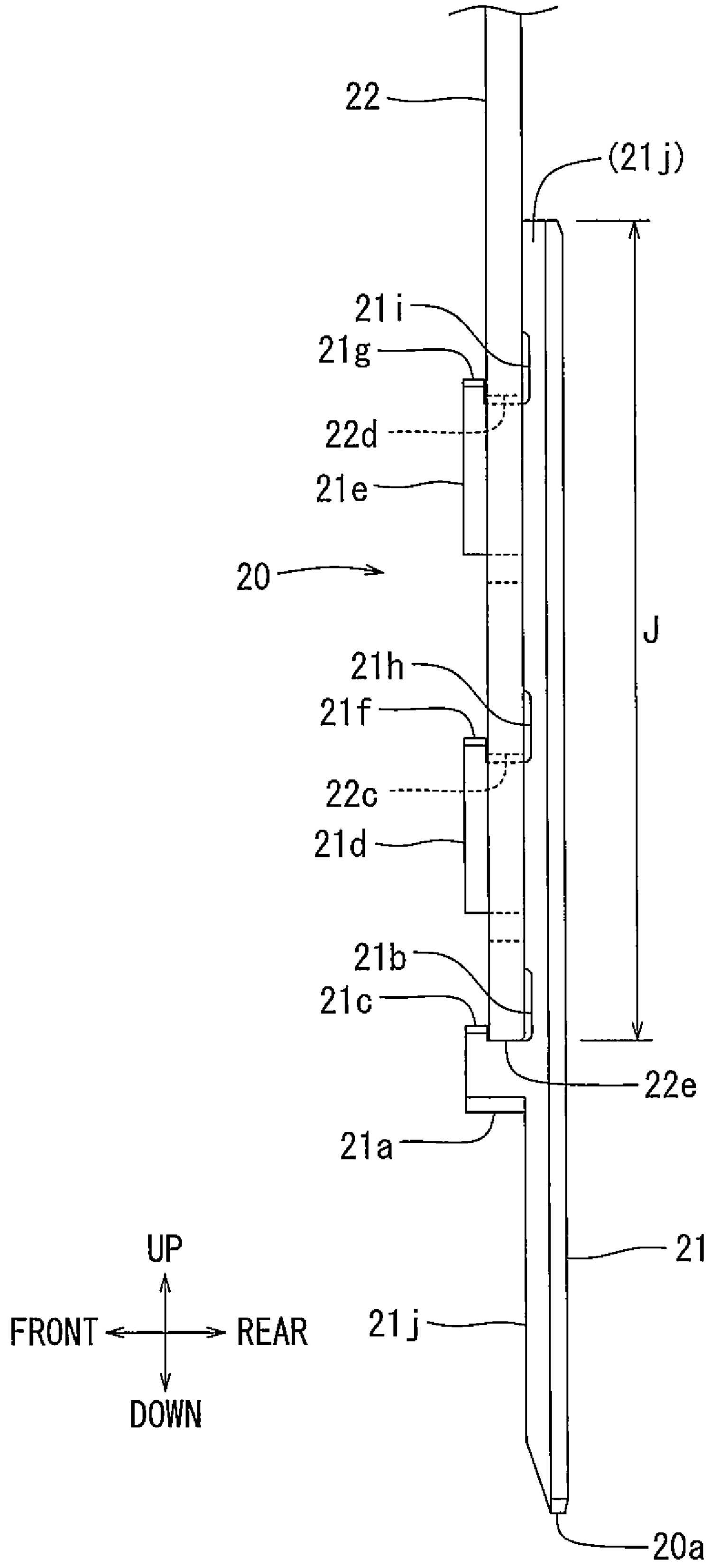
FIG. 5 is a side view of the driver according to the first embodiment.
Figure 6:
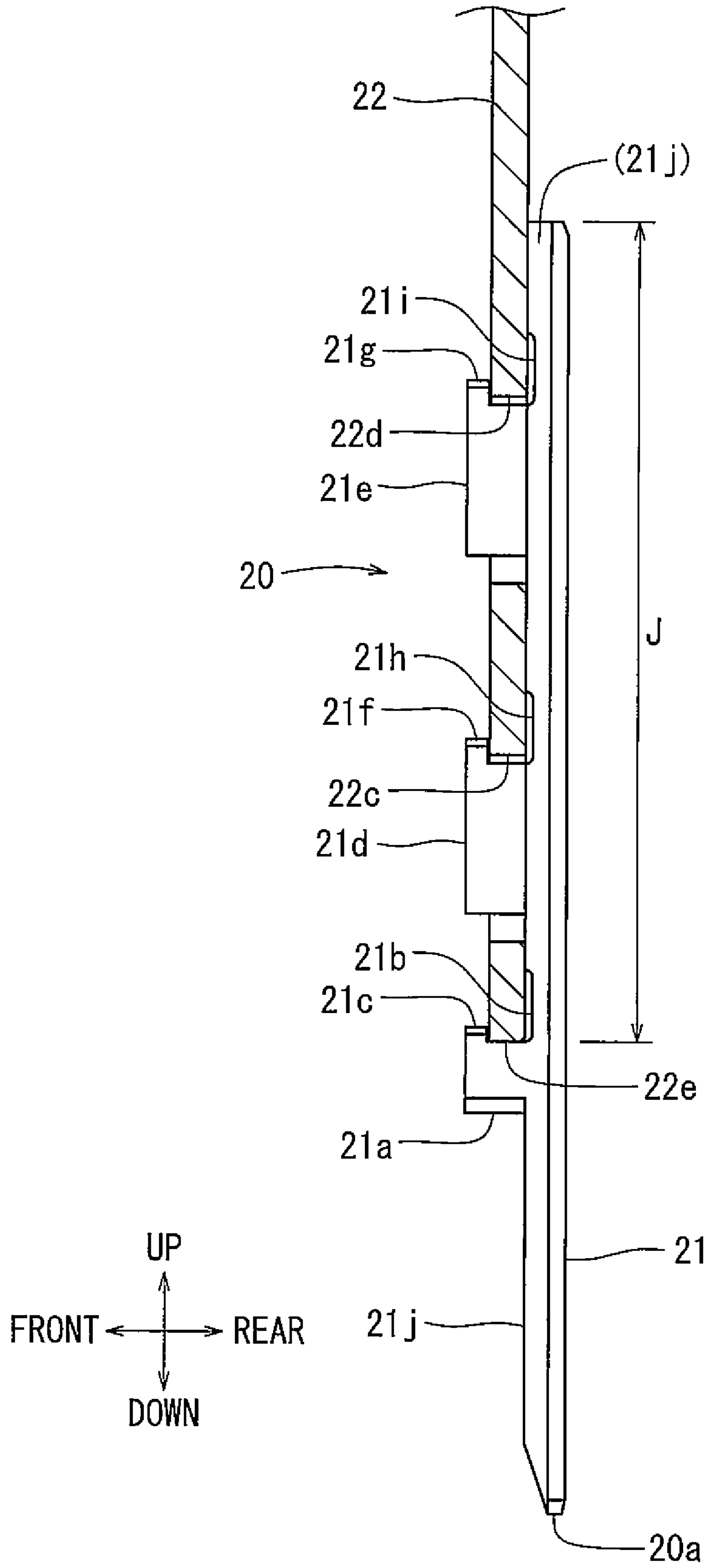
FIG. 6 a cross-sectional view of a part of the driver according to the first embodiment.
Figure 7:
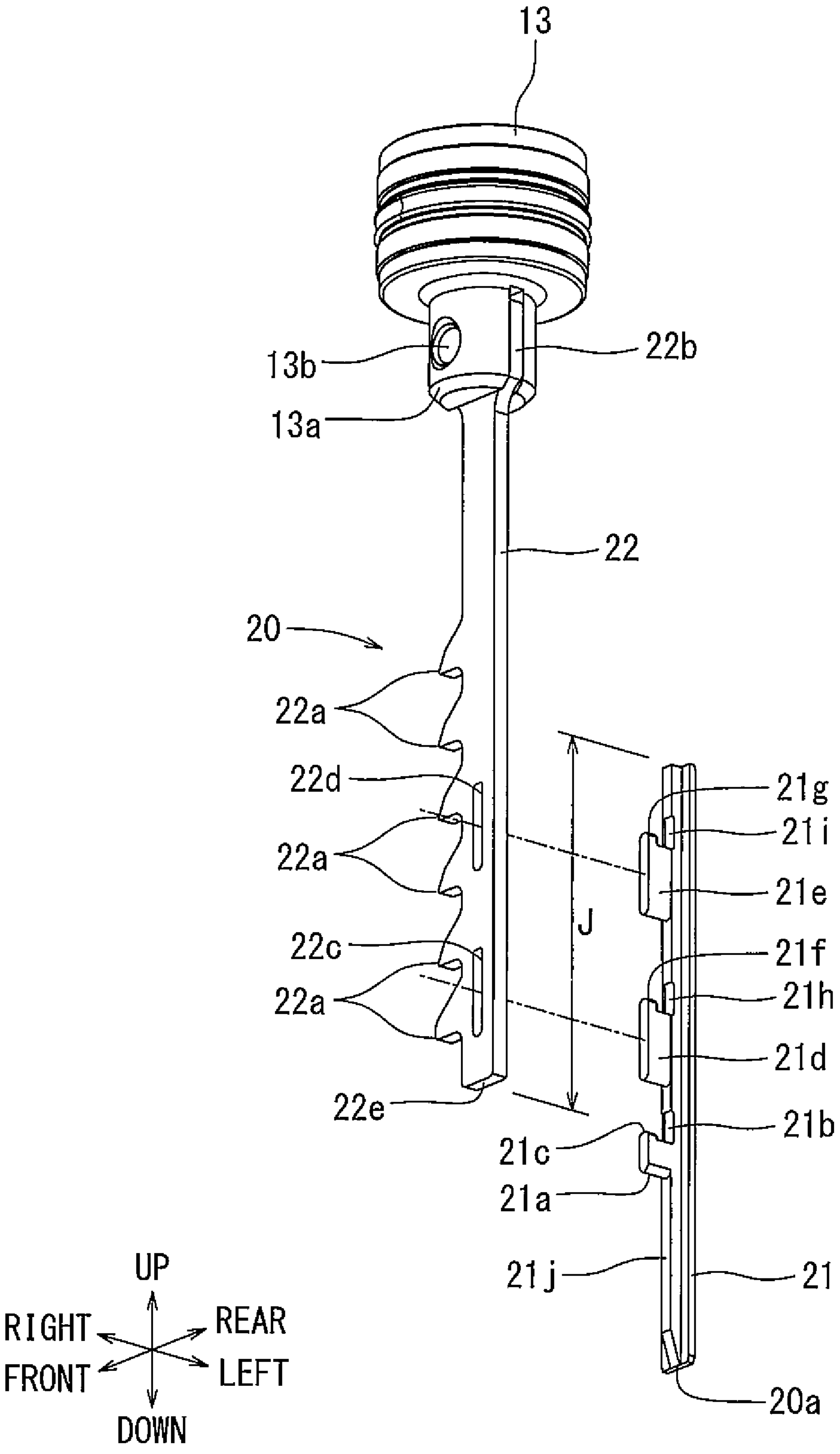
FIG. 7 is an exploded perspective view of the driver according to the first embodiment.

As shown in FIGS. 4 to 6, the striker 21 is provided with one contact portion 21*a*. The contact portion 21*a* is provided in front of the projecting strip (connecting portion) 21*j* with the same width as the projecting strip 21*j*. The contact portion 21*a* projects forward (toward the engagement member 22). An end 22*e* of the engagement member 22 in the driving direction is in contact with the contact portion 21*a*. This restricts upward misalignment of the striker 21 with respect to the engagement member 22 and ensures high impact resistance when the driver 20 is driven. A relief recess 21*b* is formed at the base of the contact portion 21*a*. The relief recess 21*b* ensures that the end 22*e* of the engagement member 22 comes in contact with the contact portion 21*a* from above.

The front end of the contact portion 21*a* has a hook portion 21*c* that extends upward. The hook portion 21*c* protrudes on the opposite joining side (front side) of the engagement member 22. The hook 21*c* receives a force in the joint separating direction (removing direction) of the engagement member 22, thereby enhancing the strength of the joint between the striker 21 and the engagement member 22.

As shown in FIGS. 4 to 7, two protrusions 21*d*, 21*e* are provided on the front surface of the striker 21 above the contact portion 21*a*. The two protrusions 21*d*, 21*e* are provided on the front surface of the projecting strip 21*j* with the same width as the projecting strip 21*j*. The two protrusions 21*d*, 21*e* project forward (toward the engagement member 22). The two protrusions 21*d*, 21*e* are inserted into recesses 22*c*, 22*d* of the engagement member 22, respectively. The hooks 21*f*, 21*g* projecting upward are formed at the front end of the two protrusions 21*d*, 21*e*. The hooks 21*f*, 21*g* project to the opposite joining side (front side) of the engagement member 22. The hooks 21*f*, 21*g* also receive a force in the joint separating direction (removing direction) of the engagement member 22. As a result, the joint strength of the striker 21 and the engagement member 22 is further enhanced.

Relief recesses 21*h*, 21*i* are formed at the base of the two protrusions 21*d*, 21*e*. The relief recesses 21*h*, 21*i* allow the upper ends of the recesses 22*c*, 22*d* of the engagement member 22 to be positioned sufficiently close to upper parts of the protrusions 21*d*, 21*e*, respectively. This causes the upper ends of the recesses 22*c*, 22*d* to enter behind the hooks 21*f*, 21*g*, respectively, and to be securely hooked against the removing direction.

The end 22*e* of the engagement member 22 is hooked onto the hooked portion 21*c* of the contact portion 21*a* of the striker 21. The upper ends of the recesses 22*c* and 22*d* of the engagement member 22 are also hooked onto the hooks 21*f* and 21*g* of the protrusions 21*d* and 21*e* of the striker 21. The high joint strength of the striker 21 and the engagement member 22 is ensured as the engagement member 22 is hooked to the striker 21 in the joint separating direction at three points in the driving direction.

As shown in FIG. 6, the length of the two recesses (holes) 22*c*, 22*d* of the engagement member 22 in the up-down direction is slightly larger than the length of the two protrusions 21*d*, 21*e* in the up-down direction including the hooks 21*f*, 21*g* of the striker 21. This allows the striker 21 and the engagement member 22 to approach in the front-rear direction (joining direction) orthogonal to the mutual driving direction and to have the protrusions 21*d*, 21*e* inserted straight into the recesses 22*c*, 22*d* in the joining process of the striker 21 and the engagement member 22. Therefore, good assemblability (joining workability) of the driver 20 may be ensured.

After inserting the protrusions 21*d* and 21*e* of the striker 21 into the recesses 22*c* and 22*d* of the engagement member 22 and allowing the striker 21 and engagement member 22 to come in contact in the thickness direction, for example, by shifting the striker 21 upward or shifting the engagement member 22 downward, the end 22*e* of the engagement member 22 comes in contact with the contact portion 21*a* of the striker 21. In this contacting state, the upper ends of the two recesses 22*c* and 22*d* enter behind the hooks 21*f* and 21*g*, respectively. In this contact state, the striker 21 and the engagement member 22 are mutually joined at the joint J, for example by copper brazing.

Figure 10:
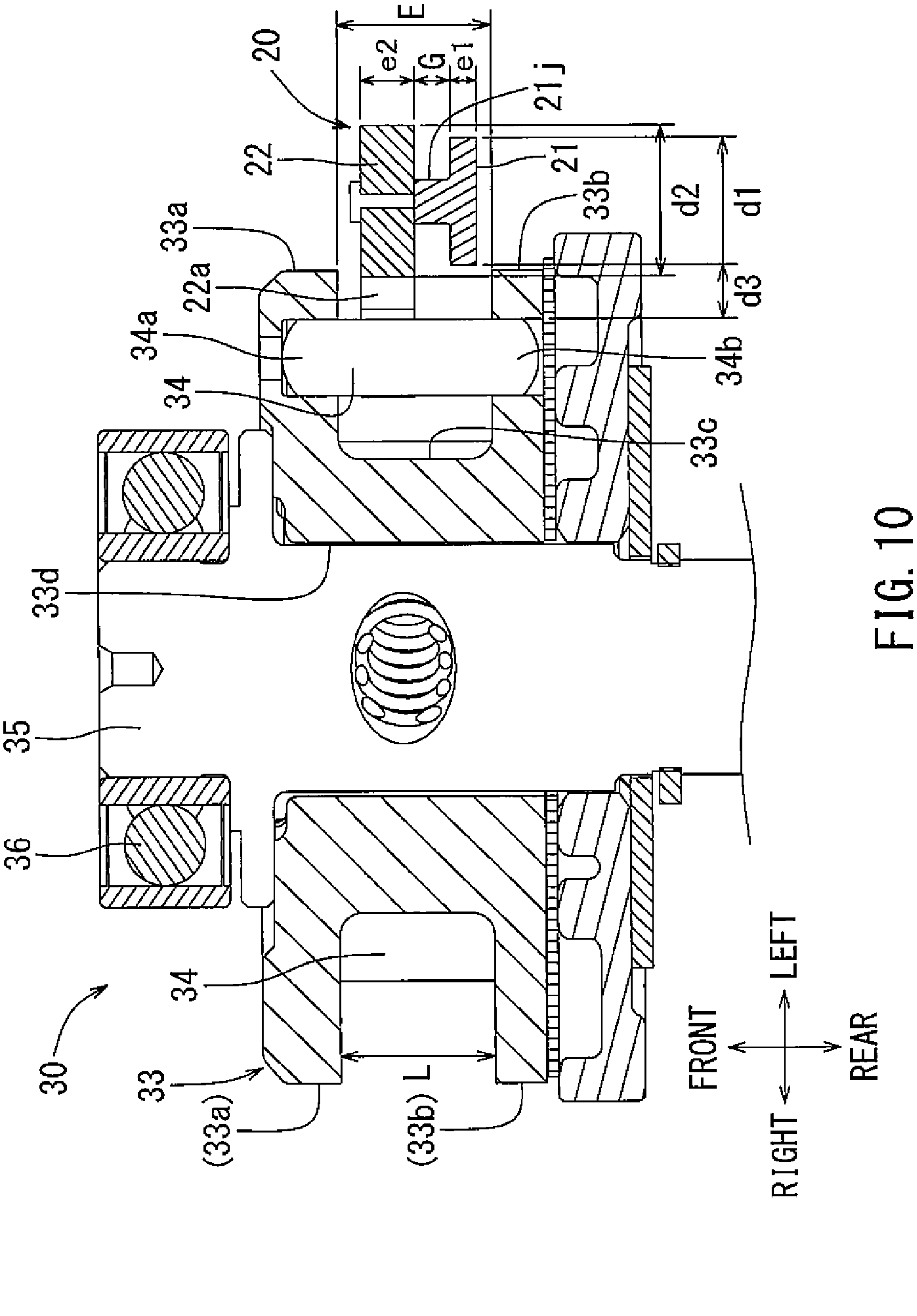
FIG. 10 is a vertical sectional view of a part of the driver and the lift mechanism according to the first embodiment.

As shown in FIG. 10, an interval G corresponding to the height of the projecting strip (connecting portion) 21*j* is provided between the striker 21 and the engagement member 22. As shown in FIG. 11, a guide wall 17*a* for the striker 21 to pass through and a release channel 17*b* for the engagement member 22 to pass through are provided in the driving channel 17 while being displaced from each other in the front-rear direction. Guide rails 17*c* are provided as guide portions between the guide wall 17*a* and the release channel 17*b*. The guide rails 17*c* are provided right and left facing each other. The left and right guide rails 17*c* extend along the driving direction. The projecting strip (connecting portion) 21*j* of the driver 20 is positioned between the left and right guide rails 17*c*. The driver 20 is guided in the driving direction by the left and right guide rails 17*c*. The protruding strip 21*j* is guided by the left and right guide rails 17*c*, which allow the driver 20 to be guided up and down without any rattling in the front-back and left-right directions (in the width and thickness directions).

As shown in FIGS. 9 and 10, a lift wheel (lifter) 33 has a front first flange 33*a* and a rear second flange 33*b* formed in one piece. The first flange 33*a* and second flange 33*b* extend radially parallel to each other. The first flange 33*a* extends radially from the front end of the cylindrical body 33*c*. The second flange 33*b* extends radially from the rear end of the body 33*c*. The first flange 33*a*, the second flange 33*b* and the body 33*c* are formed as one piece with each other. The output shaft 35 of the reduction gear train 32 is inserted into the inner circumferential hole 33*d* of the body 33*c*. Through the inner circumferential hole 33*d* of the body 33*c*, the lift wheel 33 integrally rotates about the output shaft 35.

A plurality of engagement portions (engaged portions, engagement pins) 34 are supported at both ends across the first flange 33*a* and the second flange 33*b*. The first end (front end) 34*a* of each engagement portion 34 is supported to the first flange 33*a*. The second end (rear end) 34*b* of each engagement portion 34 is supported to the second flange 33*b*.

As shown in FIG. 10, the driver 20 is disposed in the axial area E, which corresponds to an interval L between the first flange 33*a* and second flanges 33*b*, when viewed from a direction (left-right or up-down) orthogonal to the axial direction (front-rear direction) of the engagement portion (engaged portion, engagement pin) 34. As a result, the striker 21 and the engagement member 22 are fitted within the axial area E. Therefore, as shown in FIG. 4, at least for the longitudinal area of the driver 20, the engagement area K in which the engaging section 22*a* of the engagement member 22 is present and the area D corresponding to the engagement portion of the striker 21 (corresponding to the engagement area K) are fitted within the axial area E of the lift wheel (lifter) 33.

As shown in FIG. 10, the minimum distance d3 between the striker 21 and the engagement portion (engaged portion, engagement pin) 34 is less than the width d1 of the striker 21 (d1>d3). The lift wheel (lifter) 33 is disposed closer to the driver 20 (striker 21) to the distance d3 less than the width d1 with respect to the relative position in the left-right direction, thereby achieving compactness of the lift mechanism 30 mainly in the left-right direction.

In this embodiment, to achieve the compactness of the lift mechanism 30 in the left-right direction, the interval L between the first flange 33*a* and the second flange 33*b* of the lift wheel (lifter) 33 is set so that the driver 20 having a two-member joint structure with the striker 21 and the engagement member 22 overlapped in the thickness direction (front-rear direction) can be fitted within the axial area E of the engagement portion (engaged portion, engagement pin) 34.

It is allowed for the lift wheel (lifter) 33 to be enlarged rearward (rearward in the axial direction of the output shaft 35) to secure the interval L between the first flange 33*a* and the second flange 33*b* in the front-back direction. Even if the lift wheel 33 is enlarged rearward, the so-called center height H (the height of the front end of the driving nose 15 from the driving channel 17, see FIG. 7) will not increase as long as the compactness of the lift mechanism 30 in the left-right direction is not disturbed and any enlargement to the front of the lift mechanism 30 (axially forward of the output shaft 35) is avoided. Therefore, the workability of a driving operation, for example, working at the edge of a wall, will not be reduced.

According to the first embodiment described above, the driving tool 1 is joined with the engagement member 22 shifted in the front-rear direction (thickness direction) orthogonal to the longitudinal direction of the driver 20 with respect to the striker 21. As shown in FIG. 8, the release channel 17*b* for the engaging section 22*a* of the engagement member 22 to passes through is shifted in the direction orthogonal to the longitudinal direction of the driver 20 (front-back direction) with respect to the guide wall 17*a* of the striker 21. This makes it possible to independently set the guide channel width L1 for guiding the striker 21 and the release channel width L2 for the engaging section 22*a* to pass through. Therefore, the guide channel width L1 between the right and left guide walls 17*a* can be expanded to guide the wider striker 21 without causing the release channel 17*b* to expand to the side (right side). A wider driven member t, such as a staple, can be driven in by using a wider striker 21.

According to the first embodiment, the protrusions 21*d*, 21*e* of the striker 21 are fitted into the recesses 22*c*, 22*d* of the engagement member 22. Therefore, the striker 21 and the engagement member 22 are firmly joined through the recess-protrusion fitting between the protrusions 21*d*, 21*e* and the recesses 22*c*, 22*d* such that the impact resistance of the driver 20 against impact at the time of driving is enhanced.

According to the first embodiment, two recess-protrusion fitting portions for the protrusions 21*d*, 21*e* and recesses 22*c*, 22*d* are provided in the longitudinal direction of the driver 20. Accordingly, the striker 21 and the engagement member 22 are more firmly joined along the longitudinal direction of the driver 20 to enhance the impact resistance of the driver 20.

According to the first embodiment, the engagement member 22 includes a connecting portion 13*a* that is coupled to the piston 13. Therefore, the cost of the driver 20 can be reduced by minimizing the proportion of the striker 21, which has a complex shape in terms of having a contact portion 21*a* and protrusions 21*d*, 21*e*, etc.

According to the first embodiment, the striker 21 includes a contact portion 21*a* that extends toward the engagement member 22 to come in contact with the end 22*e* of the engagement member 22 in the driving direction. Therefore, the impact resistance of the driver 20 at the time of driving the driven member t is enhanced.

According to the first embodiment, the striker 21 includes hooks 21*c*, 21*f*, and 21*g* that extend to the opposite joining side (front side) of the engagement member 22 to restrict the engagement member 22 from separating. The three hooks 21*c*, 21*f*, 21*g* lined up in the longitudinal direction of the driver 20 receive the force in the joint separating direction of the engagement members 22 (removing direction), thereby increasing the joint strength between the striker 21 and the engagement members 22.

According to the first embodiment, a hook 21*c* is provided on the contact portion 21*a* of the striker 21. Accordingly, when the end 22*e* of the engagement member 22 comes in contact with the contact portion 21*a* in the driving direction, displacement of the engagement member 22 in the joint separating direction is restricted by the hook portion 21*c*. As a result, the impact resistance of the driver 20 is enhanced while the structure is simplified, and the joint strength of the striker 21 and the engagement member 22 may be increased by the hook 21*c*.

Modifications can be made to the first embodiment. FIGS. 9 to 11 show a driver 25 of the second embodiment. The driver 25 of the second embodiment has a two-member joint structure in which the striker 26 and the engagement member 27 are joined to each other to form a single unit.

According to the first embodiment, the striker 21 and engagement member 22 of the driver 20 are disposed to fit within the axial area E (interval L between the first flange 33*a* and the second flange 33*b*) of the engagement portion (engagement pin) 34 of the lift wheel (lifter) 33. Thus, the striker 21 and the engagement member 22 are compactly arranged within the axial area E of the engagement portion 34. This facilitates the widening of the striker 21. A wider stable can be stably driven in while avoiding the lift mechanism 30 and the driving nose 15 being increased in size and thus adopting a wider striker 21.

According to the first embodiment, the driver 20 includes a connecting portion (projecting strip 21*j*) having a projecting strip shape that connects the striker 21 and the engagement member 22. This enhances the impact resistance of the striker 21 and the engagement member 22.

According to the first embodiment, a guide rail 17*c* is provided in the driving channel 17 that guides the projecting strip (connecting portion) 21*j* along the driving direction. Accordingly, the driver 20 is guided in the driving direction without rattling, thereby ensuring a stable driving operation.

According to the first embodiment, the striker 21 has a flat plate shape. Therefore, the compactly arranged leading end 20*a* of the striker 21 stabilizes the driving action of a wide staple.

According to the first embodiment, the striker 21 may be located within the width of the engagement member 22 (d1<d2). This keeps the striker 21 being compactly arranged and an increase in size of the driving nose 15 may be avoided.

According to the first embodiment, a minimum distance d3 between the striker 21 and the engagement pin 34 is smaller than the width d1 of the striker 21 (d1>d3). Thus, the striker 21 is positioned closer to the engagement pin 34 to avoid an increase in size of the driving nose 15.

According to the first embodiment, the thickness e2 of the engagement member 22 is greater than the thickness e1 of the striker 21 (e1<e2). Accordingly, each engagement portion 22*a* is securely engaged with the engagement pin 34, thereby ensuring a smooth return motion of the striker 21.

According to the first embodiment, the center of the thickness of the engagement member 22 coincides with the center of the piston 13, thereby ensuring a smooth return motion of the piston 13.

According to the first embodiment, the first flange 33*a* and second flange 33*b* of the lift wheel (lifter) 33 are formed of one member. Thus, the lift wheel 33 is ensured to have high rigidity.

According to the first embodiment, the striker 21 and an engagement member 22, which are mutually separate members, are joined to each other. Thus, it is easier to ensure the lightweight and durability of the striker 21 and the engagement member 22. The manufacturing cost may be reduced as the striker 21 and the engagement member 22 are made as separate components.

Figure 12:
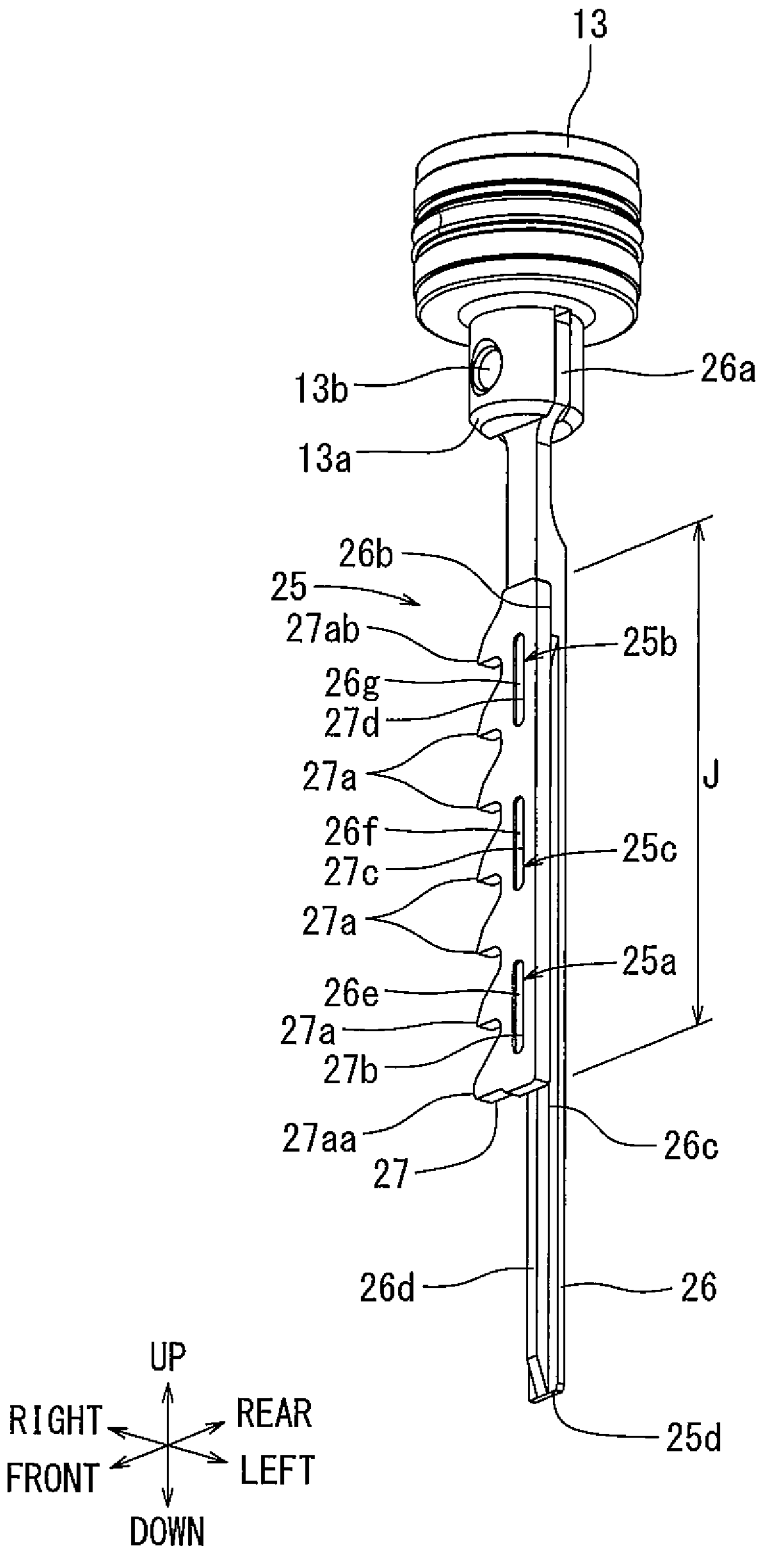
FIG. 12 is a perspective view of the driver according to the second example.
Figure 13:
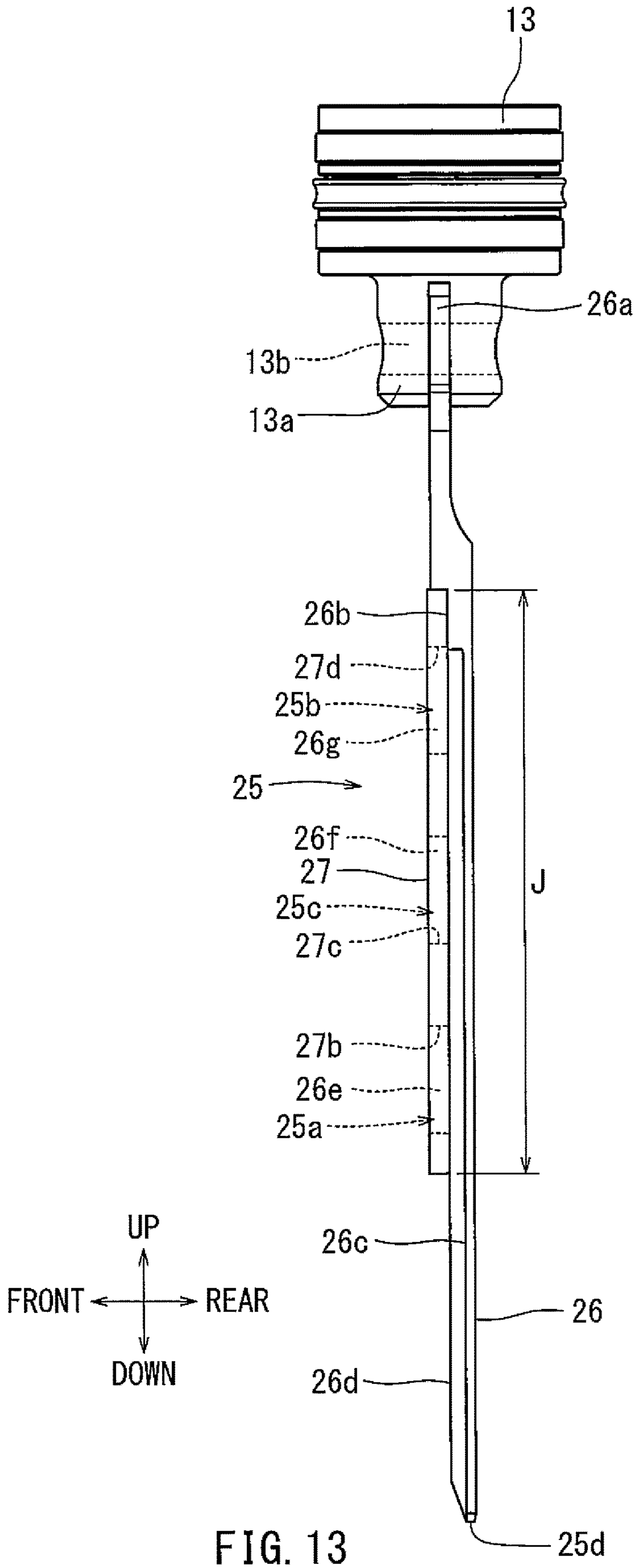
FIG. 13 is a side view of the driver according to the second example.
Figure 14:
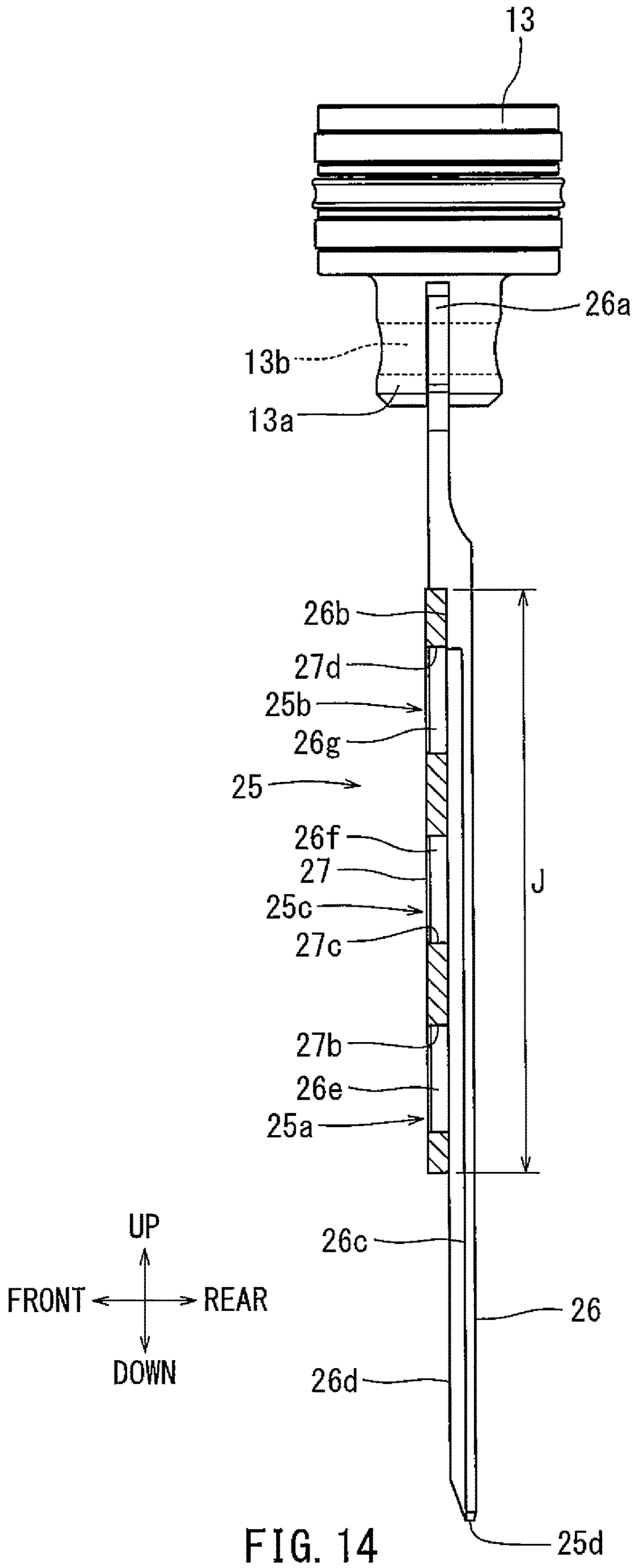
FIG. 14 is across-sectional view of a part of the driver according to the second example.

According to the second embodiment as shown in FIGS. 12 to 14, a coupling portion 26*a* for the piston 13 is provided at the top of the striker 26. The coupling portion 26*a* is inserted into the connecting portion 13*a* of the piston 13 to allow the connecting pin 13*b* be inserted, thereby connecting the striker 26 to the lower side of the piston 13.

Two steps 26*b* and 26*c* are formed on the front surface of the striker 26 along the longitudinal direction. The upper step 26*b* is provided in a vertically short area. An upper portion of the engagement member 27 is joined within the upper step 26*b*. The lower step 26*c* is provided in a long area from the bottom of the upper step 26*b* to the leading end 25*d* of the striker 26. A projecting strip 26*d* is provided on the front side of the lower step 26*c*. The projecting strip 26*d* is provided over the entire area of the lower step 26*c*. The projecting strip 26*d* projects forward with a constant width along the center of the lower step 26*c* in the width direction.

The engagement member 27 is joined over the entire area of the upper step 26*b* and approximately half of the upper area of the lower step 26*c* (joint J). The front side of the projecting strip 26*d* is joined to the lower step 26*c*. Like the first embodiment, the striker 26 and the engagement member 27 may be joined to each other by, for example, copper brazing. This connects the engagement member 27 on the central axis of the piston 13.

Three protrusions 26*e*, 26*f*, 26*g* having the same shape are provided on the front side of the striker 26. The three protrusions 26*e*, 26*f*, 26*g* are provided on the front side of the projecting strip 26*d* with the same width and projecting forward. The three protrusions 26*e*, 26*f*, 26*g* are long in the up-down direction. The three protrusions 26*e*, 26*f*, 26*g* are inserted into recesses (holes) 27*b*, 27*c*, 27*d* of the engagement member 27, respectively.

A plurality (seven in the figure) of engaging sections 27*a* are provided on the right side of the engagement member 27. Each engaging section 27*a* is formed to have a rack tooth shape projecting to the right. The plurality of engaging sections 27*a* are arranged at constant intervals in the longitudinal direction (up-down direction) of the driver 25. The lift wheels 33 of the lift mechanism 30 are sequentially engaged with the plurality of engaging sections 27*a*. The plurality of engaging sections 27*a* includes a first (lower end) leading engaging section 27*aa* and a last (upper end) final engaging section 27*ab* in the moving direction (up-down direction) of the driver 25.

The engagement member 27 has three recesses 27*b*, 27*c*, 27*d* penetrating in the thickness direction. The three recesses 27*b*, 27*c*, 27*d* are formed to have a vertically elongated groove hole. The lower recess 27*b* is located to the side of the leading engaging section 27*aa*. The upper recess 27*d* is located on the side of the final engaging section 27*ab*. The protrusion 26*e* of the striker 26 is fitted into the lower recess 27*b* to form a first fitted portion 25*a*. The protrusion 26*g* of the striker 26 is fitted into the upper recess 27*d* to form a second fitted portion 25*b*. A protrusion 26*f* of the striker 26 is fitted into the recess 27*c* in the center of the vertical direction to form a third fitted portion 25*c*.

A first fitting portion 25*a* is provided in which a protrusion 26*e* of the striker 26 is fitted at a position corresponding to the area of at least one section in the up-down direction of the leading engaging section 27*aa* of the engagement member 27. A second fitting portion 25*b* is provided in which a protrusion 26*g* of the striker 26 is fitted at a position corresponding to at least one section of the area in the up-down direction of the final engagement portion 27*ab*. This increases the strength of the joint of the engagement member 27 to the striker 26 for the entire area in the driver movement direction of the plurality of engagement portions 27*a*.

According to the second embodiment shown in FIGS. 12 to 14, the engagement member 27 is shifted and joined to the striker 26 in the front-rear direction (thickness direction) orthogonal to the longitudinal direction of the driver 25. Therefore, similarly to the first embodiment, the release channel 17*b* for the engaging section 27*a* of the engagement member 27 to passes through is shifted in the front-rear direction (thickness direction) orthogonal to the longitudinal direction of the driver 25. This allows the wider striker 26 to guide by widening the interval between the left and right guide walls 17*a* without causing the release channel 17*b* to expand to the side (right side). A wider driven member t, such as a staple, can be driven in by using a wider striker 26.

According to the second embodiment, the striker 26 has a coupling portion 26*a* that is coupled to the piston 13. Therefore, the striking force of the driver 25 is efficiently exerted by the direct coupling of the striker 26 to the piston 13. The coupling structure is simplified because no force in the removing direction is applied to the engagement member 27 when the driven member t is struck.

According to the second embodiment, the plurality of engagement portions 27*a* includes a leading engaging section 27*aa* at the leading end in the moving direction of the driver 25 and a last final engaging section 27*ab*. The engagement member 27 has a first fitting portion 25*a* for the striker 26 to be fitted at a position corresponding to the leading engaging section 27*aa*, and a second fitting portion 25*b* for the striker 26 to be fitted at a position corresponding to the final engaging section 27*ab*. Thus, the joint strength of the engagement member 27 to the striker 26 is increased over the entire area of the plurality of engagement portions 27*a* in the driver moving direction.

Further modifications may be made to the embodiments described above. For example, the first and second embodiments illustrate a configuration in which the engagement members 22, 27 are joined to the front side of the strikers 21, 26; however, the strikers may be joined to the front side of the engagement members. In this case, the contact portion of the striker and, for example, two protrusions may be provided on the rear side of the striker.

The first and second embodiments illustrate a configuration in which the center of thickness of the engagement members 22, 27 is located on the center axis of the piston 13. Alternatively, a configuration may be made in which the center of thickness of the strikers 21, 26 is coaxial with the center axis of the piston 13.

In the first embodiment, the configuration in which the protrusions 21*d*, 21*e* on the striker 21 are fitted into the recesses 22*c*, 22*d* of the engagement member 22 is illustrated. Conversely, the protrusions on the engagement member may also be configured to be fitted into the recesses of the striker.

In the first embodiment, a configuration with hooks 21*f*, 21*g* at the top of the protrusions 21*d*, 21*e* is illustrated; however, the hooks may be provided at other portions of the protrusions 21*d*, 21*e*. The hooks may also be omitted.

In the second embodiment, the configuration in which the protrusions 26*e*, 26*f*, 26*g* on the striker 26 are fitted into the recesses 27*b*, 27*c*, 27*d* of the engagement member 27 is illustrated. Conversely, the protrusions on the engagement member may also be configured to be fitted into the recess on the striker.

The first embodiment shows two and the second embodiment shows three recess-protrusion fitting portions between the striker and the engagement member; however, each of these portions may be increased, decreased, or omitted as appropriate.

The projecting strip 21*j* of the striker 21 in the first embodiment and the projecting strip 26*d* of the striker 26 in the second embodiment may be omitted.

The first embodiment shows a configuration in which the striker 21 and the engagement member 22 are made of the same steel material; however, they may be made of different materials. Similarly, in the second embodiment, the striker 26 and the engagement member 27 may be made of the same material or of different materials. If different materials are used, it is preferable if the material of the striker is of a higher strength than the material of the engagement member.

In the embodiments, the entire longitudinal area of the driver 20, excluding the entire striker 21 and the coupling portion 22*b* of the engagement member 22, fits the axial area E. Alternatively, the configuration may be changed so that the area that does not pass through the side of the lift wheel (lifter) 33 in a series of striking movements is out of the axial area E. For example, as shown in FIG. 2, the lower area of the striker 21 (the area below the contact portion 21*a*) is always lower than the side of the lift wheel 33. Also, for example, as shown in FIG. 3, the upper area of the engagement member 22 (the area above the uppermost engaging section 22*a*) is always located above the side of the lift wheel 33. Even if these areas are out of the axial direction area E, at least for the longitudinal area of the driver 20, if it is configured that the engagement area K in which the engaging section 22*a* of the engagement member 22 is present and the area D corresponding to the engagement portion of the striker 21 corresponding to the engagement area K are fitted within the axial area E of the lift wheel (lifter) 33, the driver 20 is allowed to approach the lift wheel 33, thereby achieving the compactness of the lift mechanism 30 and the driving nose 15.

The invention claimed is:

1. A driving tool comprising:

a piston configured to move due to gas pressure;

a driver coupled to the piston, wherein the driver and the piston are movable together within a cylinder, wherein the driver includes a striker configured to strike a driven member, and an engagement member having a plurality of engaging sections along a moving direction of the driver, and wherein the engagement member joins the striker in a direction orthogonal to a longitudinal direction of the driver; and a lifter that engages with the plurality of engaging sections to return the driver to an initial position, and wherein the driving tool has at least one protrusion formed on one side of either the striker or the engagement member, and a corresponding at least one recess is formed on another side of the striker or the engagement member, and wherein the striker and the engagement member are joined via at least one of recess-protrusion fitting portion by inserting each of the at least one protrusion into each of the at least one recess.

2. The driving tool according to claim 1, wherein more than one of recess-protrusion fitting portions are formed in the longitudinal direction of the driver.

3. The driving tool according to claim 1, wherein the striker further has a contact portion configured to extend toward the engagement member and to contact an end of the engagement member in a driving direction.

4. The driving tool according to claim 1, wherein the striker includes a plurality of hook portions, that are aligned in the longitudinal direction of the driver, wherein the plurality of hook portions is configured to project to an opposite joining side of the engagement member to restrict the engagement member from being separated.

5. The driving tool according to claim 3, wherein the contact portion has a hook portion configured to project to an opposite joining side of the engagement member to restrict the engagement member from being separated from the striker.

6. The driving tool according to claim 3, wherein the contact portion has a relief recess formed at a base of the contact portion.

7. The driving tool according to claim 1, wherein the plurality of engaging sections includes a leading engaging section positioned at a leading end in the moving direction of the driver and a final engaging section positioned at a final end, wherein the engagement member has a first fitting portion configured to be fitted by the striker at a position corresponding to a part of the leading engaging section and a second fitting portion configured to be fitted by the striker at a position corresponding to a part of the final engaging section.

8. The driving tool according to claim 1, wherein the driving tool includes (i) a driving channel having guide walls configured to guide the striker and (ii) a release channel configured for one of the engaging sections of the engagement member to pass through, wherein the guide walls and the release channel are displaced in a thickness direction.

9. A driving tool comprising:

a piston configured to move due to gas pressure;

a driver coupled to the piston, wherein the driver and the piston are movable together within a cylinder, wherein the driver includes a striker configured to strike a driven member and an engagement member having a plurality of engaging sections along a moving direction of the driver, and wherein the engagement member joins the striker in a direction orthogonal to a longitudinal direction of the driver; and a lifter that engages with the plurality of engaging sections to return the driver to an initial position, and wherein the striker includes a hook portion configured to project to an opposite joining side of the engagement member to restrict the engagement member from being separated.

10. The driving tool according to claim 9, wherein the driving tool includes a connecting portion configured for connecting the striker and the engagement member.

11. The driving tool according to claim 10, wherein the driving tool includes a guide portion configured to guide the connecting portion along a driving direction.

12. The driving tool according to claim 9, wherein the striker has a flat plate shape.

13. The driving tool according to claim 9, wherein the striker is located within a width of the engagement member.

14. The driving tool according to claim 9, wherein a minimum distance between the striker and an engaged portion is less than a width of the striker.

15. The driving tool according to claim 9, wherein a thickness of the engagement member is greater than a thickness of the striker.

16. The driving tool according to claim 9, wherein a center of thickness of the engagement member coincides with a center of the piston.

17. The driving tool according to claim 9, wherein the lifter further includes a first flange and a second flange, and the first and second flanges of the lifter are formed of one member.

18. The driving tool according to claim 9, wherein the striker and the engagement member are separate members and mutually joined.

* * * * *